United States Patent
Matsui

[11] Patent Number: 6,030,914
[45] Date of Patent: *Feb. 29, 2000

[54] ZIRCONIA FINE POWDER AND METHOD FOR ITS PRODUCTION

[75] Inventor: Koji Matsui, Shinnanyo, Japan

[73] Assignee: Tosoh Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/966,568

[22] Filed: Nov. 10, 1997

[30] Foreign Application Priority Data

Nov. 12, 1996 [JP] Japan .................................. 8-300081
Nov. 26, 1996 [JP] Japan .................................. 8-314637

[51] Int. Cl.$^7$ .................................................. C04B 35/48
[52] U.S. Cl. ............................................................. 501/103
[58] Field of Search ............................................... 501/103

[56] References Cited

U.S. PATENT DOCUMENTS 4,719,091  1/1988  Wusirika et al. .
4,977,114  12/1990 Horinouchi et al. .
5,693,299  12/1997 Chopin et al. .
5,712,218  1/1998  Chopin et al. .

FOREIGN PATENT DOCUMENTS 194556  9/1986  European Pat. Off. .
437154  7/1991  European Pat. Off. .
605274  7/1994  European Pat. Off. .

*Primary Examiner*—Paul Marcantoni
*Attorney, Agent, or Firm*—Nixon & Vanderhye

[57] ABSTRACT

A zirconia fine powder consisting of primary particles having a BET specific surface area of from 40 to 200 m$^2$/g and a mean particle size of at most 0.1 μm as measured by an electron microscope, wherein the ratio of the mean particle size as measured by an electron microscope to a mean particle size calculated from the BET specific surface area, is at least 0.9.

3 Claims, No Drawings

ZIRCONIA FINE POWDER AND METHOD FOR ITS PRODUCTION

The present invention relates to a zirconia fine powder useful as e.g. an additive component of a three way catalyst for cleaning an exhaust gas of e.g. an automobile, and a method for its production.

Nitrogen oxide ($NO_x$), carbon monoxide (CO) and hydrocarbons (CH), which are hazardous substances contained in an exhaust gas discharged from an internal combustion engine, are removed, for example, by a three way catalyst having Pt, Rh, Pd or the like supported on a carrier. The atmosphere for which the three way catalyst is used, is an oxidation-reduction atmosphere which is called a theoretical air-to-fuel (A/F) ratio. To promote an oxidation-reduction reaction in the vicinity of this A/F ratio, ceria is incorporated as a co-catalyst. Ceria absorbs oxygen in an oxidizing atmosphere and discharges oxygen in a reducing atmosphere. This characteristic is utilized to effectively clean CO, CH and $NO_x$ as exhaust gas components.

However, if a three way catalyst having ceria incorporated thereto, is contacted with a high temperature exhaust gas, there will be problems, such as progress of sintering and oxidation of Rh due to an adverse effect of ceria, deterioration in the oxygen absorption-desorption characteristic due to aggregation of ceria. To suppress the aggregation of ceria, it has been proposed to improve the heat resistance, for example, by adding a component such as Ba, Zr or La. For this purpose, a highly dispersible zirconia powder, which is readily miscible with the three way catalyst or the co-catalyst or a zirconia powder having ceria solid-solubilized therein capable of efficiently absorbing and evolving oxygen, is desired.

Heretofore known as a zirconia powder added to a catalyst or co-catalyst for cleaning an exhaust gas, is, for example, ① a zirconium oxide powder obtained by drying and baking a precipitate obtained by adding aqueous ammonia to an aqueous solution of cerium, neozium and zirconium salts (JP-A-6-63403), ② a zirconium-cerium double oxide powder obtained by spray heating a mixed aqueous solution of cerium and zirconium salts in an oxidizing atmosphere (JP-A-8-73221), or ③ a composite oxide having a φ phase as a crystal phase, which is a compound comprising cerium oxide, zirconium oxide and hafnium oxide (JP-A-8-109020).

The zirconium oxide powder of ① is prepared by drying and baking a precipitate obtained by adding aqueous ammonia to an aqueous solution of cerium, neozium and zirconium salts. However, the gel-like precipitate thus obtained forms hard coarse particles when baked, thus presenting a powder having a broad particle size distribution and poor dispersibility, which can hardly uniformly be mixed with the three way catalyst. If such a catalyst component is contacted with a high temperature exhaust gas, the cleaning efficiency tends to be low, and as such, the powder will be not suitable as an additive component of the three way catalyst.

The zirconium-cerium oxide powder of ② is prepared by spraying and thermally decomposing a mixed aqueous solution of cerium and zirconium salts to obtain a composite oxide powder having a BET specific surface area of from 17 to 23 $m^2/g$. However, if such a powder having a small BET specific surface area i.e. a large particle size and poor dispersibility, is added to a three way catalyst, the uniformity with the three way catalyst tends to be poor, and if such a catalyst component is contacted with an exhaust gas, the oxygen supply efficiency tends to be low, and as such, the composite oxide powder will not be suitable as a co-catalyst.

The composite oxide of ③ is obtained by baking a co-precipitate obtained by adding a precipitating agent such as aqueous ammonia to a solution containing cerium, zirconium and hafnium ions. However, the compound obtainable by such a co-precipitation method tends to form hard coarse particles when baked, which have poor dispersibility, thus leading to one having a poor oxygen supply efficiency, as mentioned above.

It is an object of the present invention to overcome the drawbacks of such conventional methods and to provide a highly dispersible zirconia fine powder which is excellent in uniform miscibility with a three way catalyst or in solid-solubility with a co-catalyst (ceria) and which is thus capable of exhibiting an effect for suppressing aggregation of ceria even at a high exhaust gas temperature; a highly dispersible fine powder of zirconia having ceria solid-solubilized therein which is capable of providing a good oxygen supply efficiency in an exhaust gas i.e. capable of efficiently supplying oxygen even at a low exhaust gas temperature and which is excellent also in uniform miscibility with a three way catalyst; and a method whereby such zirconia fine powders can be prepared by a simple process.

The present inventors have studied the relation between the dispersibility and the microstructure of the zirconia powder in detail paying an attention to the mean primary particle size and the BET specific surface area of the zirconia powder and have also studied the relation between the exhaust gas temperature and the oxygen supply efficiency in the exhaust gas in detail paying an attention to the BET specific surface area of the zirconia powder having a ceria solid-solubilized therein and the uniformity of ceria, and as a result, they have arrived at the present invention.

That is, the present invention provides a zirconia fine powder consisting of primary particles having a BET specific surface area of from 40 to 200 $m^2/g$ and a mean particle size of at most 0.1 μm as measured by an electron microscope, wherein the ratio of the mean particle size as measured by an electron microscope to a mean particle size calculated from the BET specific surface area, is at least 0.9; a fine zirconia powder which is a zirconia fine powder having ceria solid-solubilized therein, wherein the molar ratio of $CeO_2/ZrO_2$ is from 5/95 to 60/40; a method for producing such a zirconia fine powder, which comprises baking a hydrous zirconia sol having a mean particle size of at most 0.1 μm obtained by hydrolysis of an aqueous solution of a zirconium salt, at a temperature of at most 650° C.; and a method for producing the zirconia fine powder having ceria solid-solubilized therein, which comprises mixing a hydrous fine zirconia sol obtained by hydrolysis of an aqueous solution of a zirconium salt, and a cerium compound, so that the molar ratio of $CeO_2/ZrO_2$ would be from 5/95 to 60/40, and baking the mixture at a temperature of from 300 to 700° C.

Now, the present invention will be described in detail with reference to the preferred embodiments.

In this specification, the "mean particle size as measured by an electron microscope" relating to a zirconia powder, is a mean value of particle sizes which are obtained in such a manner that the sizes of individual primary particles as observed by an electron microscopic photograph, are read out in terms of their areas, which are then converted to the corresponding circles to obtain the particle sizes.

The "BET specific surface area" is one measured by using nitrogen as admolecule.

The "mean particle size calculated from the BET specific surface area" is a diameter calculated from the BET specific surface area and the theoretical density by converting the particle shapes to spheres.

The "absorption-desorption of oxygen" relating to a zirconia powder having ceria solid-solubilized therein, is those containing not only the mere absorption-desorption of oxygen on the particle surface but also storage-release of atomic oxygen in the crystal lattice.

In this specification, the "mean particle size" relating to a hydrous zirconia sol is one obtained by a photon correlation method, but it presents substantially the same value as measured by an electron microscope in the same manner as described above for the zirconia powder.

The "conversion" is one represented as a ratio of the amount of the hydrous zirconia sol to the amount of the charged starting material, obtained in such a manner that the hydrous zirconia sol-containing solution is subjected to ultrafiltration, and the amount of unreacted zirconium present in the filtrate is determined by an inductively coupled plasma emission spectral analysis (IPC), whereupon the amount of the hydrous zirconia sol formed, is obtained by calculation.

The "$H^+$ concentration" relating to the reaction (hydrolysis) for formation of a hydrous zirconia sol is a value obtained by stoichiometrically calculating the $H^+$ concentration in the hydrous zirconia-containing solution in the reactor, on an assumption such that the hydrolytic reaction of a zirconium salt, as represented by the following formula, has proceeded 100%.

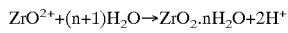
$$ZrO^{2+} + (n+1)H_2O \rightarrow ZrO_2 \cdot nH_2O + 2H^+$$

Further, the "continuous operation" relating to the reaction operation of hydrolysis means that the hydrous zirconia sol-containing solution is withdrawn from the reactor at a constant discharge rate, and at the same time, an aqueous solution of a zirconium salt is supplied to the reactor at the same supply rate as the discharge rate, and the "intermittent operation" means that a series of operations comprising discharging a predetermined amount of the hydrous zirconia sol-containing solution from the reactor, then immediately supplying an aqueous solution of a zirconium salt to the reactor in the same amount as the discharged amount, and hydrolyzing it for a predetermined period of time (hereinafter referred to as an intermittent time), are carried out repeatedly. The "supply ratio (%)" of an aqueous solution of a zirconium salt relating to the intermittent operation is one represented by $\{y/(x+y)\} \times 100$, where x is the volume of the hydrous zirconia sol-containing solution immediately before supplying the aqueous solution of a zirconium salt to the reactor, and y is the volume of the aqueous solution of a zirconium salt to be supplied to the reactor.

The BET specific surface area of the zirconia fine powder of the present invention is required to be from 40 to 200 $m^2/g$. If the BET specific surface area is smaller than 40 $m^2/g$, the dispersibility of the zirconia powder tends to be low, whereby uniformity at the time of adding it to a three way catalyst or a co-catalyst tends to be poor. Accordingly, the effect for preventing aggregation of ceria at a high exhaust gas temperature, tends to be poor, and as such, the powder will not be suitable as an additive component of a three way catalyst. The BET specific surface area is preferably from 50 to 200 $m^2/g$, more preferably from 50 to 150 $m^2/g$.

Further, the zirconia fine powder of the present invention is required to have a mean particle size of at most 0.1 μm as measured by an electron microscope. If the mean particle size of the zirconia powder is larger than 0.1 μm, uniformity with a three way catalyst or a co-catalyst tends to be poor, and as mentioned above, the effect for suppressing aggregation of ceria tends to be poor. The mean particle size is preferably from 0.01 to 0.08 μm, more preferably from 0.03 to 0.07 μm.

Further, the ratio of the mean particle size as measured by an electron microscope to the mean particle size calculated from the BET specific surface area, is required to be at least 0.9. If the mean particle size ratio is at least 0.9, the zirconia powder is in the form of highly dispersible porous or dense primary particles, whereby substantially no firm sintering is observed among the primary particles. If this ratio is less than 0.9, a number of necks among the primary particles will be observed by an electron microscope, and if the powder containing such hard aggregated particles in a large amount, is mixed with a three way catalyst, the uniformity with the three way catalyst or a co-catalyst tends to be poor, and the effect for suppressing aggregation of ceria tends to be poor, as mentioned above. The mean particle size ratio is preferably from 0.9 to 20, more preferably from 2.2 to 14.

In a case where ceria is solid-solubilized in the above fine zirconia powder, the content of ceria is required to be within a range such that the molar ratio of $CeO_2/ZrO_2$ is from 5/95 to 60/40. If the molar ratio of $CeO_2/ZrO_2$ is less than 5/95, $CeO_2$ governing absorption-desorption of oxygen tends to be less, whereby the oxygen supply efficiency in the exhaust gas will be low. On the other hand, if the molar ratio of $CeO_2/ZrO_2$ exceeds 60/40, the uniformity of solid-solubilized $CeO_2$ tends to be poor, whereby the oxygen supply ratio will be low, and the oxygen supply efficiency at a low exhaust gas temperature tends to be poor, and as such, the powder will not be suitable as a co-catalyst for a three way catalyst. The molar ratio of $CeO_2/ZrO_2$ is preferably from 10/90 to 55/45, more preferably from 30/70 to 50/50.

To obtain the zirconia fine powder of the present invention, it is required to employ a hydrous zirconia sol having a mean particle size of at most 0.1 μm, which is obtained by hydrolysis of an aqueous solution of a zirconium salt. If the mean particle size is larger than 0.1 μm, the mean particle size of the zirconia powder obtained by baking under the conditions of the present invention as described below, will be larger than 0.1 μm. Further, if the mean particle size of the above hydrous zirconia sol is controlled to be within a range of from 0.01 to 0.08 μm, and baking is carried out under the following conditions, a zirconia powder excellent in dispersibility will be obtained, and if the mean particle size is controlled to be within a range of from 0.03 to 0.07 μm, a zirconia powder having the dispersibility further improved can be obtained.

The mean particle size of the hydrous zirconia sol can be controlled by adjusting the pH of the reaction solution at the end of the reaction. For example, by adjusting the pH at the end of the reaction to from −0.1 to 0.4 or from 1 to 2, a hydrous zirconia sol having a mean particle size of at most 0.1 μm can be obtained. The method for controlling this pH i.e. the mean particle size of the hydrous zirconia sol, may, for example, be a method of adjusting the concentration of the aqueous solution of a zirconia salt for hydrolysis; a method of adding an alkali or an acid to an aqueous solution of a zirconium salt for hydrolysis; a method of adjusting the pH for hydrolysis by removing a part of anions constituting the zirconium salt by means of an anion exchange resin; or a method of adjusting the pH of a mixed slurry of zirconium hydroxide and an acid, for hydrolysis. Further, to accelerate the reaction, the hydrolytic reaction may be carried out by adding a hydrous zirconia sol to the above aqueous solution of a zirconium salt. The zirconium salt to be used for the preparation of a hydrous zirconia sol, may, for example, be zirconium oxichloride, zirconium nitrate, zirconium chloride or zirconium sulfate. Otherwise, a mixture of zirconium hydroxide and an acid, may be employed. The alkali to be added to control the mean particle size of the hydrous zirconia sol, may, for example, be ammonia, sodium hydroxide or potassium hydroxide. Further, it may be a compound which shows a basic nature upon decomposition, such as urea. The acid may, for example, be hydrochloric acid, nitric acid or sulfuric acid. Further, an organic acid such as acetic acid or citric acid may also be employed.

Using the above hydrous zirconia sol-containing solution obtained by hydrolysis of an aqueous solution of a zirconium salt as the starting solution, hydrolysis is carried out in such a manner that a part of the hydrous zirconia sol-containing solution is discharged from the reactor continuously and/or intermittently, and an aqueous solution of a zirconium salt is supplied to the reactor continuously and/or intermittently in the same amount as the discharged amount, so that the volume of the solution containing the hydrous zirconia sol is maintained to be constant, and then the discharged hydrous zirconia sol is dried and baked, whereby the productivity can be remarkably improved over hydrolysis by a conventional batch method, and this method is suitable for industrial mass production. Further, the zirconia sol obtained by this reaction operation has a conversion of at least 85%, whereby when it is baked under the condition of the present invention, firm sintering among particles due to an unreacted material will scarcely occur, and a zirconia powder having good dispersibility can be obtained. The conversion is more preferably at least 90%.

The meaning of "so that the volume of the solution containing the hydrous zirconia sol is maintained to be constant" covers both a case wherein at the same time as the discharge of the solution containing the hydrous zirconia sol from the reactor, the aqueous solution of a zirconium salt is supplied to the reactor continuously and/or intermittently in the same amount as the discharged amount, and a case wherein after such discharge, the aqueous solution of a zirconium salt is supplied to the reactor continuously and/or intermittently in the same amount as the discharged amount.

In a case where the hydrolytic reaction is carried out by a continuous operation, the discharge rate of the hydrous zirconia sol-containing solution and the supply rate of the aqueous solution of a zirconium salt, are preferably set so that the average residence time t (hr) in the reactor of the supplied aqueous solution of a zirconium salt will be within a range of from 3 to 15, and when the operation is carried out by an intermittent operation, the relation between the supply ratio a (%) of the aqueous solution of a zirconium salt and the intermittent time T (hr) will be within ranges of $0 < a \leq 60$, and $0 \leq T \leq 10$, and it satisfies:

$T \geq 0.14a - 0.6$

The concentration of the aqueous solution of a zirconium salt to be supplied to the reactor, is preferably set to be within a range of from 0.01 to 2 mol/l, more preferably from 0.1 to 1 mol/l. The zirconium salt to be supplied to the reactor may, for example, be zirconium oxichloride, zirconium nitrate, zirconium chloride or zirconium sulfate, as mentioned above. However, one having an alkali or an acid added to such an aqueous solution of a zirconium salt, may be used, or such an aqueous solution having a hydrous zirconia sol added, may be employed. The temperature of the solution in the reactor during the hydrolysis is preferably from 90° C. to the boiling point, more preferably from 95° C. to the boiling point. In addition to these conditions, if the $H^+$ concentration in the hydrous zirconia-containing solution in the reactor is controlled within a range of from 0.02 to 1 mol/l, and hydrolysis is carried out continuously and/or intermittently, it is possible to obtain a hydrous zirconia sol having a higher conversion.

In addition to the above continuous and intermittent conditions, if the operation is so set that the $H^+$ concentration C (mol/l) of the hydrous zirconia-containing solution in the reactor is $0.4 \leq C \leq 1$, and the relation between the mean particle size D ($\mu$m) of the hydrous zirconia sol in the starting solution and the $H^+$ concentration, satisfies $0.01 \leq D \cdot (C-0.35) \leq 0.08$, it is possible to obtain a hydrous zirconia sol having a high conversion and a small change with time of the mean particle size. Accordingly, when such a sol is baked under the following conditions, a fine zirconia powder having a further improved dispersibility will be obtained. A preferred range is $0.015 \leq D \cdot (C-0.35) \leq 0.05$.

The method for drying the hydrous zirconia sol-containing solution obtained by this reaction, is not particularly limited, and it may, for example, be a method in which the hydrous zirconia sol-containing solution is spray-dried, or a method in which an alkali or the like is added to the solution, followed by filtration and washing with water and then by drying.

Then, the dried powder of the hydrous zirconia sol obtained as described above, is required to be baked at a temperature of at most 650° C. If the baking temperature is higher than 650° C., the BET specific surface area of the resulting fine zirconia powder tends to be smaller than 40 m²/g, and the zirconia fine powder of the present invention can hardly be obtained. The baking temperature is more preferably from 200 to 600° C., particularly preferably from 300 to 500° C. The baking temperature is preferably maintained for from 0.5 to 10 hours, and the temperature-raising rate is preferably from 0.5 to 10° C./min. If the maintaining time is shorter than 0.5 hour, uniform heating tends to be difficult, and if it is longer than 10 hours, the productivity tends to be poor, such being undesirable. If the temperature-raising rate is less than 0.5° C./min, the time until the predetermined temperature is reached, tends to be long, and if it is higher than 10° C./min, the powder is likely to scatter during heating, whereby the operation efficiency tends to be poor, and the productivity will be low. The powder thus obtained is free from hard aggregation among primary particles, and simply by disintegration, a zirconia powder having good dispersibility can be obtained.

To obtain a fine zirconia powder having ceria solid-solubilized therein, of the present invention, the hydrous zirconia sol obtained as described above, and a cerium compound, are mixed so that the molar ratio of $CeO_2/ZrO_2$ would be from 5/95 to 60/40. There is no particular limitation as to a method for mixing the hydrous zirconia sol and the cerium compound and drying the mixture. Namely, the cerium compound may be added to the above-described hydrous zirconia-containing solution obtained by hydrolysis so that the molar ratio of $CeO_2/ZrO_2$ would be from 5/95 to 60/40, followed by drying. Otherwise, the cerium compound may be added beforehand at the time of hydrolytic reaction. As a method for drying the mixed solution comprising the cerium compound and the hydrous zirconia sol, the above-mentioned method may be employed. For example, a method wherein the mixed solution is spray-dried, or a method wherein an alkali is added to the mixed solution, followed by filtration, washing with water and drying, may be mentioned. As a cerium compound to be used as a raw material for ceria, cerium hydroxide, cerium oxide, cerium chloride, cerium nitrate, cerium sulfate, cerium carbonate or cerium acetate, may, for example, be mentioned.

Then, the mixture of the hydrous zirconia sol and the cerium compound obtained as described above, is baked at a temperature of from 300 to 700° C. If the baking temperature is lower than 300° C., it tends to be difficult to obtain a fine zirconia powder having ceria uniformly solid-solubilized therein. On the other hand, if it exceeds 700° C., the BET specific surface area of the resulting fine zirconia powder tends to be smaller than 40 m²/g. The baking temperature is preferably from 350 to 600° C. The maintaining time of the baking temperature and the temperature-raising rate may be set to be from 0.5 to 10 hours and from 0.5 to 10° C./min, in the same manner as described above.

The baked powder is free from hard aggregation among primary particles, and only by disintegration, a fine zirconia powder having good dispersibility can be obtained.

The zirconia fine powder of the present invention may be added to a three way catalyst comprising desired components. If necessary, a predetermined amount of a desired rare earth element such as cerium or neozium may preliminarily be solid-solubilized in the zirconia fine powder, and then the powder may be added to a three way catalyst. The zirconia fine powder having ceria solid-solubilized therein, may be added in a predetermined amount to a three way catalyst.

The catalyst component prepared as described above may be wash-coated on a honeycomb-structured substrate made of cordierite, followed by drying and baking to obtain a catalyst for cleaning an exhaust gas.

As described in the foregoing, the fine zirconia powder of the present invention is ① excellent in uniformity with a three way catalyst or a co-catalyst and accordingly capable of providing an effect for suppressing aggregation of ceria even at a high exhaust gas temperature, and ② with the fine powder having ceria solid-solubilized therein, the oxygen supply efficiency in an exhaust gas is good, i.e. oxygen supply is efficiently performed even at a low exhaust gas temperature, and it is excellent also in uniform miscibility with a three way catalyst. Further, by the method of the present invention, such a fine zirconia powder can easily be produced. Especially when using a hydrous zirconia sol-containing solution obtained by hydrolysis of an aqueous solution of a zirconium salt as a starting solution, hydrolysis is carried out in such a manner that a part of the hydrous zirconia sol-containing solution is discharged from the reactor continuously and/or intermittently, and an aqueous solution of a zirconium salt is supplied to the reactor continuously and/or intermittently in the same amount as the discharged amount, and the obtained hydrous zirconia sol is dried and baked, the productivity will be improved remarkably over hydrolysis by a conventional batch method, whereby industrial mass production will be made possible.

Now, the present invention will be described in further detail with reference to Examples. However, it should be understood that the present invention is by no means restricted to such specific Examples.

In Examples, the mean particle size of the hydrous zirconia sol was determined by a photon correlation method. The mean particle size of primary particles of the zirconia powder measured by an electron microscope, was obtained by means of a transmission electron microscope. As the density of zirconia particles (monoclinic phase) required to calculate the mean particle size from the BET specific surface area, 5.6 g/cm³ was used.

EXAMPLE 1

An aqueous solution containing 0.45 mol/l of $ZrOCl_2$ was boiled for 200 hours to obtain a hydrous zirconia sol having a mean particle size of 0.08 µm. Aqueous ammonia was added to this hydrous zirconia sol-containing solution to agglomerate the hydrous zirconia sol, followed by filtration, washing with distilled water and drying. The dried powder of the hydrous zirconia sol thus obtained, was baked for 2 hours at a temperature of 350° C.

The obtained zirconia powder had a BET specific surface area of 140 m²/g, and the mean particle size of primary particles as measured by an electron microscope was 0.08 µm (i.e. mean particle size ratio=10). Thus, it was confirmed that the powder was in the form of primary particles having good dispersibility substantially free from sintering among the primary particles.

EXAMPLE 2

The operation was carried out under the same conditions as in Example 1 except that the baking temperature was set to be 500° C. The obtained zirconia powder had a BET specific surface area of 64 m²/g, and the mean particle size of primary particles as measured by an electron microscope was 0.07 µm (average particle size ratio=4.2). Thus, it was confirmed that the powder was in the form of primary particles having good dispersibility substantially free from sintering among the primary particles.

EXAMPLE 3

The operation was carried out under the same conditions as in Example 1 except that an aqueous solution containing 0.04 mol/ of $ZrOCl_2$ was boiled for 100 hours.

The obtained zirconia powder had a BET specific surface area of 73 m²/g, and the mean particle size of primary particles as measured by an electron microscope was 0.06 µm (average particle size ratio=4.1). Thus, it was confirmed that the powder was in the form of primary particles having good dispersibility substantially free from sintering among the primary particles.

EXAMPLE 4

The operation was carried out under the same conditions as in Example 1 except that an aqueous solution containing 0.02 mol/l of $ZrOCl_2$ was boiled for 100 hours.

The obtained zirconia powder had a BET specific surface area of 59 m²/g, and the mean particle size of primary particles as measured by an electron microscope was 0.04 µm (average particle size ratio=2.2). Thus, it was confirmed that the powder was in the form of primary particles having good dispersibility substantially free from sintering among the primary particles.

COMPARATIVE EXAMPLE 1

The operation was carried out under the same conditions as in Example 1 except that the baking temperature was set to be 700° C. The obtained zirconia powder had a BET specific surface area of 35 m²/g.

COMPARATIVE EXAMPLE 2

The operation was carried out under the same conditions as in Example 3 except that the baking temperature was set to be 700° C. The obtained zirconia powder had a BET specific surface area of 33 m²/g.

By the following Examples 5 to 8, a production method wherein a part of a solution containing hydrous zirconium is withdrawn from the reactor continuously and/or intermittently, and an aqueous solution of a zirconium salt is supplied to the reactor continuously and/or intermittently in the same amount as the discharged amount, will be specifically described.

The changes with time of the mean particle sizes and the conversions of the hydrous zirconia sols obtained in Examples 5 to 8, are shown in Table 1.

EXAMPLE 5

An aqueous solution containing 0.4 mol/l of $ZrOCl_2$ was hydrolyzed for 200 hours at the boiling temperature to obtain a hydrous zirconia sol-containing solution ($H^+$ concentration C=0.8 mol/l). The obtained hydrous zirconia sol had a mean particle size (D) of 0.08 μm. Using 10 l of this sol-containing solution as the starting solution, an intermittent operation type hydrolytic reaction was carried out at the boiling temperature. As the intermittent conditions, the discharge amount of the hydrous zirconia sol-containing solution and the supply amount of the aqueous solution of $ZrOCl_2$ (0.4 mol/l) were, respectively, 500 ml (a=5%), and the intermittent time (T) was set to be 0.5 hr (i.e. $0.1 \leq T \leq 10$, D(C−0.35)=0.036). Under the above conditions, the hydrolytic reaction was carried out for 30 hours, to obtain 30 l of a hydrous zirconia sol-containing solution discharged from the reactor. Aqueous ammonia was added to this hydrous zirconia sol-containing solution to agglomerate the hydrous zirconia sol, followed by filtration, washing with distilled water and drying. The dried powder of the hydrous zirconia sol thus obtained, was baked for 2 hours at a temperature of 400° C.

The obtained zirconia powder had a BET specific surface area of 104 m²/g, and the mean particle size of primary particles as measured by an electron microscope was 0.07 μm (i.e. mean particle size ratio=6.8). Thus, it was confirmed that the powder was in the form of primary particles having good dispersibility substantially free from sintering among the primary particles.

EXAMPLE 6

To 1.8 l of an aqueous solution containing 2 mol/l of $ZrOCl_2$, 1 l of the starting solution as used in Example 1, was added, and distilled water was added to obtain 7.3 l of a solution. This solution was hydrolyzed for 95 hours at the boiling temperature. Then, 2.7 l of distilled water was added to obtain 10 l of a hydrous zirconia sol-containing solution (C=0.8). The obtained hydrous zirconia sol had a mean particle size (D) of 0.06 μm. Using this sol-containing solution as the starting solution, an intermittent operation type hydrolytic reaction was carried out for 300 hours under the same intermittent conditions as in Example 1 (i.e. D·(C−0.35)=0.027).

Then, a dried powder of the hydrous zirconia sol was obtained under the same conditions as in Example 5, and it was baked for 2 hours at a temperature of 450° C.

The obtained zirconia powder had a BET specific surface area of 78 m²/g, and the mean particle size of primary particles as measured by an electron microscope was 0.065 μm (i.e. mean particle size ratio=4.7). Thus, it was confirmed that the powder was in the form of primary particles having good dispersibility substantially free from sintering among the primary particles.

EXAMPLE 7

To 1.49 l of an aqueous solution containing 2 mol/l of $ZrOCl_2$, 75 me of the starting solution as used in Example 5, was added, and distilled water was added to obtain 8.2 l of a solution. This solution was hydrolyzed for 70 hours at the boiling temperature. Then, 1.8 l of distilled water was added thereto to obtain 10 l of a hydrous zirconia sol-containing solution (C=0.6). The obtained hydrous zirconia sol had a mean particle size (D) of 0.11 μm. Using this sol-containing solution as the starting solution, an intermittent operation type hydrolytic reaction was carried out for 300 hours at the boiling temperature. With respect to the intermittent conditions, the discharged amount of the hydrous zirconia sol-containing solution and the supply amount of the aqueous solution of $ZrOCl_2$ (0.3 mol/l) were, respectively, 500 ml (a=5%), and the intermittent time (T) was set to be 0.5 hour (i.e. $0.1 \leq T \leq 10$, D·(C−0.35)=0.028).

Then, a dried powder of the hydrous zirconia sol was obtained under the same conditions as in Example 5, and it was baked for 2 hours at a temperature of 350° C.

The obtained zirconia powder had a BET specific surface area of 150 m²/g, and the mean particle size of primary particles as measured by an electron microscope was 0.10 μm (i.e. mean particle size ratio=14). Thus, it was confirmed that the powder was in the form of primary particles having good dispersibility substantially free from sintering among the primary particles.

EXAMPLE 8

Using 10 l of the starting solution prepared under the same conditions as in Example 5, a continuous operation type hydrolytic reaction was carried out for 30 hours at the boiling temperature. The discharged rate of the hydrous zirconia sol-containing solution and the supply rate of the aqueous solution of $ZrOCl_2$ (0.4 mol/l) were, respectively, set to be 1 l/hr (i.e. average residence time t=10 hr, D·(C−0.35)=0.036).

Then, a dried powder of the hydrous zirconia sol was obtained under the same conditions as in Example 5, and it was baked for 2 hours at a temperature of 400° C.

The obtained zirconia powder had a BET specific surface area of 101 m²/g, and the mean particle size of primary particles as measured by an electron microscope was 0.065 μm (i.e. mean particle size ratio=6.1). Thus, it was confirmed that the powder was in the form of primary particles having good dispersibility substantially free from sintering among the primary particles.

TABLE 1

| | Reaction time (hr) | 0 | 10 | 20 | 30 | 50 | 100 | 150 | 200 | 300 |
|---|---|---|---|---|---|---|---|---|---|---|
| Example 5 | Mean particle size (μm) | 0.08 | 0.07 | 0.07 | 0.07 | | | | | |
| | Conversion (%) | 89 | 94 | 97 | 98 | | | | | |
| Example 6 | Mean particle size (μm) | 0.06 | 0.07 | 0.07 | 0.07 | 0.06 | 0.07 | 0.07 | 0.07 | 0.07 |
| | Conversion (%) | 91 | 95 | 97 | 98 | 98 | 98 | 99 | 98 | 98 |
| Example 7 | Mean particle size (μm) | 0.11 | 0.11 | 0.09 | 0.09 | 0.10 | 0.11 | 0.10 | 0.11 | 0.11 |
| | Conversion (%) | 92 | 96 | 98 | 98 | 98 | 98 | 99 | 98 | 98 |

TABLE 1-continued

| | Reaction time (hr) | 0 | 10 | 20 | 30 | 50 | 100 | 150 | 200 | 300 |
|---|---|---|---|---|---|---|---|---|---|---|
| Example 8 | Mean particle size (μm) | 0.08 | 0.07 | 0.06 | 0.06 | | | | | |
| | Conversion (%) | 89 | 95 | 97 | 98 | | | | | |

COMPARATIVE EXAMPLE 3

An aqueous solution containing 0.4 mol/s of $ZrOCl_2$ was hydrolyzed for 100 hours at the boiling temperature. The conversion of the obtained hydrous zirconia sol was examined and found to be 60%. Then, a dried powder of the hydrous zirconia sol was obtained under the same conditions as in Example 5, and it was baked for 2 hours at a temperature of 700° C. The obtained zirconia powder had a BET specific surface area of 29 $m^2/g$.

By the following Examples 9 to 14, production of a zirconia fine powder having ceria solid-solubilized therein and the oxygen absorption-desorption of the powder were evaluated.

The oxygen absorption-desorption as an index of the oxygen supply efficiency was evaluated by the following method.

The test sample for evaluation was prepared by mixing in a wet system a zirconia powder (50 wt %) obtained in one of the following Examples and a Pt-supported alumina powder (50 wt %) prepared by a dipping method, followed by drying. This mixed powder was molded and pulverized to obtain a regulated powder, which was then packed into an atmospheric pressure fixed bed flow reaction tube and treated in a model gas of 800° C., whereupon the oxygen absorption-desorption was measured at 450° C.

EXAMPLE 9

2 l of an aqueous solution containing 0.4 mol/l of $ZrOCl_2$ was boiled for 160 hours. Then, to this solution, 3.6 l of an aqueous solution containing 2 mol/! of $ZrOCl_2$ and 4.4 l of distilled water were added, and the mixture was further boiling for 64 hours to obtain a hydrous zirconia sol having a mean particle size of 0.056 μm.

Then, 6 l of an aqueous solution containing 0.5 mol/l of $CeCel_3$ was added to the above hydrous zirconia sol-containing solution (molar ratio of $CeO_2/ZrO_2=30/80$). Then, while stirring the mixed solution, aqueous ammonia having a concentration of 1 mol/l was slowly dropwise added thereto until the pH of the solution reached within a range of from 9 to 10. The obtained precipitate was collected by filtration, washed with distilled water and dried, and then it was baked for 2 hours at a temperature of 400° C.

The obtained zirconia powder had a BET specific surface area of 103 $m^2/g$, and the mean particle size of primary particles as measured by an electron microscope was 0.06 μm. Thus, it was confirmed that the powder was in the form of primary particles having good dispersibility.

Then, the above fine zirconia powder and an alumina powder having Pt supported thereon were mixed and treated at 800° C., whereupon the oxygen absorption-desorption was examined and found to be 28 μmol/g.

EXAMPLE 10

2.25 l of an aqueous solution containing 2 mol/l of $ZrOCl_2$ and 7.12 l of distilled water were added to 0.63 l of the hydrous zirconia-containing solution obtained in Example 9, and the mixture was boiled for 67 hours to obtain a hydrous zirconia sol having a mean particle size of 0.07 μm.

Then, 6.6 l of an aqueous solution containing 0.5 mol/l of $CeCel_3$ was added to the above hydrous zirconia sol-containing solution (molar ratio of $CeO_2/ZrO_2=33/50$). Then, while stirring the mixed solution, aqueous ammonia having a concentration of 1 mol/l, was slowly added until the pH of the solution reached within a range of from 9 to 10. The obtained precipitate was collected by filtration, washed with distilled water and dried, and then it was baked for 2 hours at a temperature of 600° C. The obtained zirconia powder had a BET specific surface area of 45 $m^2/g$, and the mean particle size of primary particles as measured by an electron microscope was 0.08 μm. Thus, it was confirmed that the powder was in the form of primary particles having good dispersibility.

Then, the above fine zirconia powder and an alumina powder having Pt supported thereon were mixed and treated at 800° C., whereupon the oxygen absorption-desorption of the mixed powder was examined and found to be 38 μmol/g.

EXAMPLE 11

2.48 l of an aqueous solution containing 2 mol/l of $ZrOCl_2$ and 6.42 l of distilled water were added to 1.1 l of the hydrous zirconia-containing solution obtained in Example 10, and the mixture was boiled for 75 hours to obtain a hydrous zirconia sol having a mean particle size of 0.06 μm.

Then, 9 l of an aqueous solution containing 0.5 mol/l of $CeCl_3$ was added to the above hydrous zirconia sol-containing solution (molar ratio of $CeO_2/ZrO_2=9/11$). Then, while stirring the mixed solution, aqueous ammonia having a concentration of 1 mol/l, was slowly dropwise added until the pH of the solution reached within a range of from 9 to 10. The obtained precipitate was collected by filtration, washed with distilled water and dried, and then, it was baked for 2 hours at a temperature of 500° C. The obtained zirconia powder had a BET specific surface area of 61 $m^2/g$, and the mean particle size of primary particles as measured by an electron microscope was 0.07 μm. Thus, it was confirmed that the powder was in the form of primary particles having good dispersibility.

Then, the above fine zirconia powder and an alumina powder having Pt supported thereon were mixed and treated at 800° C., whereupon the oxygen absorption-desorption of the mixed powder was examined and found to be 52 μmol/g.

EXAMPLE 12

2.25 l of an aqueous solution containing 2 mol/l of $ZrOCl_2$, 4.1 mol of $CeCel_3 \cdot 7H_2O$ and 6.2 l of distilled water were mixed to 1 l of the hydrous zirconia-containing solution obtained in Example 10 (molar ratio of $CeO_2/ZrO_2=41/50$), and the obtained solution was boiled for 168 hours to obtain a hydrous zirconia sol.

Then, distilled water was added to the above hydrous zirconia sol-containing solution to bring the volume twice as large. Then, while stirring the mixture, aqueous ammonia having a concentration of 1 mol/l was slowly added until the pH of the solution reached within a range of from 9 to 10. The obtained precipitate was collected by filtration, washed with distilled water and dried, and then, it was baked for 2 hours at a temperature of 500° C.

The obtained zirconia powder had a BET specific surface area of 65 m$^2$/g, and the mean particle size of primary particles as measured by an electron microscope was 0.07 μm. Thus, it was confirmed that the powder was in the form of primary particles having good dispersibility.

Then, the above fine zirconia powder and an alumina powder having Pt supported thereon were mixed and treated at 800° C., whereupon the oxygen absorption-desorption of the mixed powder was examined and found to be 56 μmol/g.

EXAMPLE 13

The operation was carried out under the same conditions as in Example 10 except that 10 l of an aqueous solution containing 0.5 mol/l of CeCel$_3$ was added (i.e. molar ratio of CeO$_2$/ZrO$_2$=1), and the baking temperature was set to be 550° C.

The obtained zirconia powder had a BET specific surface area of 54 m$^2$/g, and the mean particle size of primary particles as measured by an electron microscope was 0.08 μm. Thus, it was confirmed that the powder was in the form of primary particles having good dispersibility.

Then, the above fine zirconia powder and an alumina powder having Pt supported thereon were mixed and treated at 800° C., whereupon the oxygen absorption-desorption of the mixed powder was examined and found to be 54 μmol/g.

EXAMPLE 14

The operation was carried out under the same conditions as in Example 11 except that 13.4 l of an aqueous solution containing 0.5 mol/l of CeCel$_3$ was added (i.e. molar ratio of CeO$_2$/ZrO$_2$=67/55), and the baking temperature was set to be 600° C.

The obtained zirconia powder had a BET specific surface area of 47 m$^2$/g, and the mean particle size of primary particles as measured by an electron microscope was 0.08 μm. Thus, it was confirmed that the powder was in the form of primary particles having good dispersibility.

Then, the above fine zirconia powder and an alumina powder having Pt supported thereon were mixed and treated at 800° C., whereupon the oxygen absorption-desorption of the mixed powder was examined and found to be 45 μmol/g.

COMPARATIVE EXAMPLE 4

Aqueous ammonia was added to 2 l of a mixed aqueous solution containing 0.4 mol/l of ZrOCl$_2$ and 0.004 mol/l of CeCel$_3$ (molar ratio of CeO$_2$/ZrO$_2$=1/100) with stirring until the pH of the solution reached within a range of from 9 to 10.

The obtained gel-like precipitate was collected by filtration, washed with distilled water and dried, and then it was baked for 2 hours at a temperature of 1,000° C. The obtained zirconia powder had a BET specific surface area of 5 m$^2$/g, and the mean particle size of primary particles as measured by an electron microscope was as large as 0.5 μm. Thus, it was confirmed that the powder was in the form of particles having poor dispersibility.

Then, the above fine zirconia powder and an alumina powder having Pt supported thereon, were mixed and treated at 800° C., whereupon the oxygen absorption-desorption of the mixed powder was examined and found to be not higher than 3 μmol/g.

COMPARATIVE EXAMPLE 5

The operation was carried out under the same conditions as in Comparative Example 4 except that a mixed aqueous solution containing 0.04 mol/l of ZrOCl$_2$ and 0.4 mol/l of CeCel$_3$ (molar ratio of CeO$_2$/ZrO$_2$=10) was used, and the baking temperature was set to be 950° C.

The obtained zirconia powder had a BET specific surface area of 14 m$^2$/g. Thus, it was confirmed that the powder was in the form of agglomerated particles with substantial sintering among the particles.

Then, the above fine zirconia powder and an alumina powder having Pt supported thereon were mixed and treated at 800° C., whereupon the oxygen absorption-desorption was examined and found to be not higher than 14 μmol/g.

What is claimed is:

1. A method for producing a zirconia fine powder which comprises the steps of:

(1) preparing a hydrous zirconia sol having a mean particle size of at most 0.1 μm obtained by hydrolysis of an aqueous solution of a zirconium salt at a temperature of from 90° C. to the boiling point of the aqueous solution, (2) mixing the hydrous zirconia sol with a cerium compound, to provide a molar ratio of CeO$_2$/ZrO$_2$ from 5/95 to 60/40, and thereafter (3) baking the mixture at a temperature of from 300 to 700° C. to obtain the zirconia fine powder having ceria solid-solubilized therein in molar ratio of CeO2/ZrO2 from 5/95 to 60/40, said particles having a BET specific surface area of from 40 to 200m$^2$/g and a mean particle size of at most 0.1 μm as measured by an electron microscopes, wherein the ratio of the mean particle size as measured by electron microscope to a mean particle size calculated from the BET specific surface area is at least 0.9.

2. The method for producing a zirconia fine powder according to claim 1, wherein a portion of the solution containing the hydrous zirconia sol obtained by hydrolysis of an aqueous solution of a zirconium salt is discharged from a reactor continuously or intermittently, and an aqueous solution of a zirconium salt is supplied to the reactor continuously or intermittently in the same amount as the discharged amount so that the volume of the solution containing the hydrous zirconia sol is maintained constant, and the discharged hydrous zirconia sol is dried and baked.

3. The method of claim 1 wherein the aqueous solution of the zirconium salt is heated at a temperature of 95° C. to the boiling point of the solution.

* * * * *